H. FARRIS.
LOAD BINDER.
APPLICATION FILED DEC. 3, 1917.
1,316,290.
Patented Sept. 16, 1919.
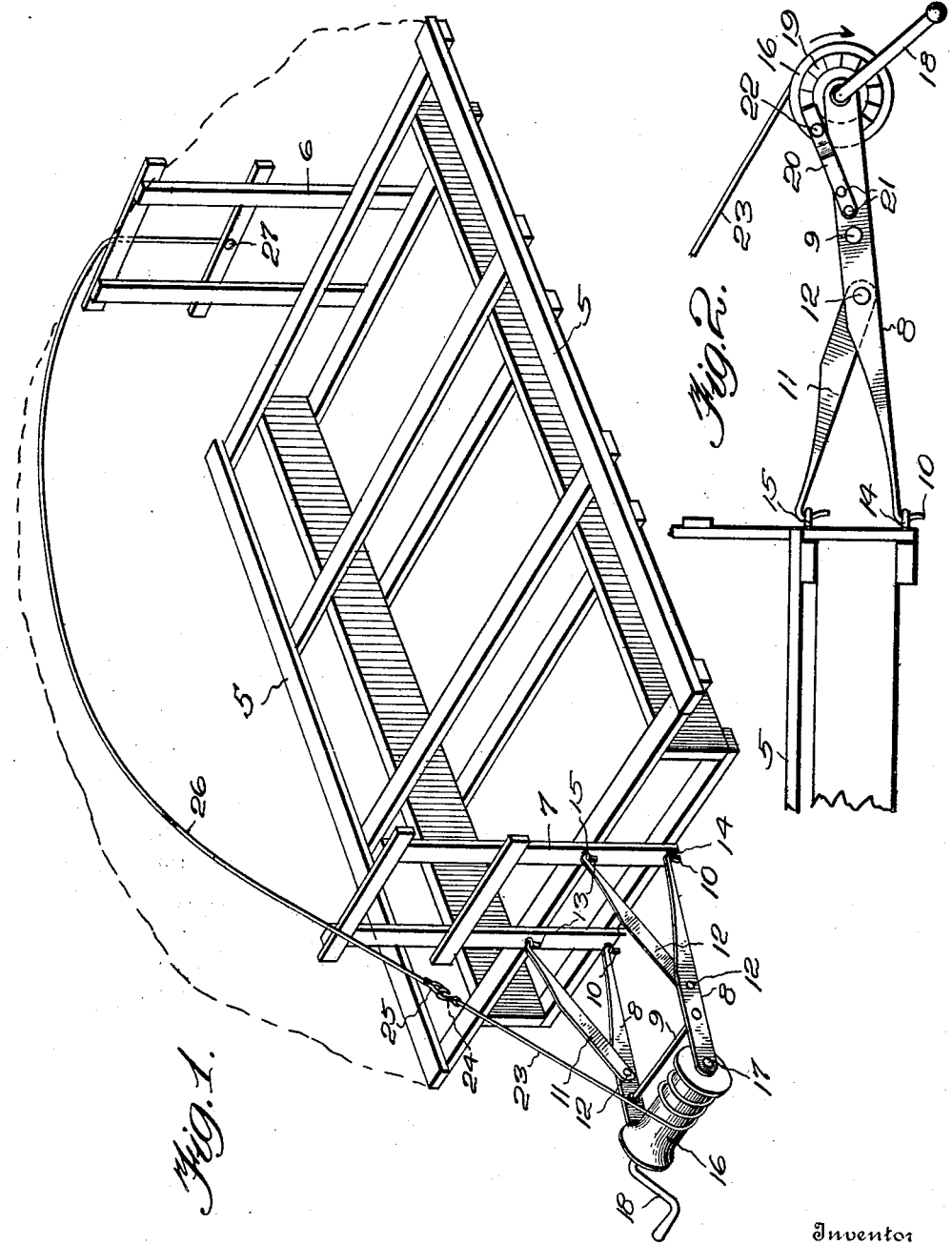
Inventor
Henry Farris,
Witness
By C. L. Parker
Attorney

UNITED STATES PATENT OFFICE.

HENRY FARRIS, OF STEUBEN, WISCONSIN.

LOAD-BINDER.

1,316,290. Specification of Letters Patent. Patented Sept. 16, 1919.

Application filed December 3, 1917. Serial No. 205,188.

*To all whom it may concern:*

Be it known that I, HENRY FARRIS, a citizen of the United States, residing at Steuben, in the county of Crawford and State of Wisconsin, have invented certain new and useful Improvements in Load-Binders, of which the following is a specification.

My invention relates to load binders, and has particular reference to such an apparatus which is adapted to be secured to a hay rack, wagon, or the like, and operated to wind up a rope, cable or the like, which binds the load.

An important object of the invention is to provide an apparatus of the above mentioned character, which may be secured to and removed from its support, in a highly expeditious and convenient manner.

A further object of the invention is to provide means whereby parts of the apparatus may be folded, whereby the entire apparatus is substantially flat, for convenience of storage, when not in use.

Other objects and advantages of the invention will be apparent during the course of the following description.

In the accompanying drawings forming a part of this specification, and in which like numerals are employed to designate like parts throughout the same, Figure 1 is a perspective view of apparatus embodying my invention, showing the same in use, and, Fig. 2 is a side elevation of the same.

In the drawings, wherein for the purpose of illustration is shown a preferred embodiment of my invention, the numeral 5 designates the floor or bottom of a hay rack, having forward and rear uprights 6 and 7, at the ends thereof. These uprights are rigidly secured to the floor or bottom 5 by any suitable means.

My apparatus comprises a pair of spaced relatively stationary arms 8, which are rigidly connected by a transverse rod 9. The forward ends of the arms 8 are provided with down turned hooks 10, as shown. Arranged within the arms 8 are swinging arms 11, pivoted thereto, as shown at 12. The arms 11 are provided at their forward ends with down turned hooks 13. The hooks 10 and 13 are adapted for insertion within attaching elements or eyes 14 and 15, which are rigidly secured to the rear upright 7.

It is thus apparent that the arms 8 are detachably and rigidly secured to the upright 7, the arms 11 when in the upper position serving as a truss or brace for the lower arms. The arms 11 may be swung to a flat position within the arms 8.

Arranged between the rear ends of the arms 8 is a drum 16, which is rigidly secured to a transverse shaft 17, journaled within openings formed in the rear ends of the arms 8. The shaft 17 is provided with a crank 18, for turning the same.

As clearly shown in Fig. 2, the drum 16 is provided upon one end thereof with a ratchet wheel 19, which is rigidly secured thereto. This ratchet wheel is engaged by a resilient dog 20, secured to one arm 8, as shown at 21. The dog or pawl 20 carries a lateral extension or handle 22, by means of which it may be moved out of engagement with the ratchet wheel 19. The drum 16 is thus adapted to be turned in the direction of its arrow, but is prevented from turning in an opposite direction.

Secured to the drum 16 to be wound thereon, when turned in the direction of its arrow, is a flexible element 23, which may be a rope, cable or the like. This flexible element 23 has a hook 24 secured to its free end, which is adapted to engage within an eye 25, carried by a rope or cable 26, which is secured to the forward upright 6, as shown at 27.

The operation of the apparatus is as follows:

The apparatus is arranged upon and secured to the rear end of the hay rack, by passing the hooks 10 and 13 into the eyes 14 and 15. The cable 26 is then passed longitudinally over the load, and the hook 24 inserted in the eye 25. The crank 18 is now turned to rotate the drum 16, whereby the cable 23 is wound thereon, and the cable 26 placed under suitable tension to securely bind the load.

I also contemplate employing the apparatus to wind up wire or the like. For this purpose, the drum 16 would be detachable from the shaft 17, so that after the wire is wound thereon the drum could be removed from the apparatus.

It is to be understood that the form of my invention herewith shown and described is to be taken as a preferred example of the same, and that various changes in the shape, size, and arrangement of parts may be resorted to without departing from the spirit of the invention or the scope of the subjoined claim.

Having thus described my invention, I claim:

A load binder comprising a pair of approximately horizontal arms arranged in spaced parallel relation and provided at their inner ends with means for connection with a wagon or the like, a bar extending between the arms to rigidly connect them in spaced relation and spaced from the ends of the arms, a drum pivotally connected with the arms outwardly of the bar and coacting with the bar to retain the arms in the parallel relation, adjustable arms pivotally connected with the approximately horizontal arms inwardly of and near the transverse bar and adapted to be folded within the horizontal arms and provided at their free ends with means for connection with a wagon body or the like, said adjustable arms being adapted to assume a diagonal position when in use.

In testimony whereof I affix my signature in presence of two witnesses.

HENRY FARRIS.

Witnesses:
W. W. KIELLEY,
ORLEY CHAMBERLAIN.

Copies of this patent may be obtained for five cents each, by addressing the "Commissioner of Patents, Washington, D. C."